United States Patent
Prudhomme et al.

[11] 3,935,985
[45] Feb. 3, 1976

[54] SUPPORT FOR WELDING HEAD CARRIAGE

[75] Inventors: Alain Prudhomme, Meudon; Michel Kotcharian, Paris, both of France

[73] Assignee: BSL Bignier Schmid·Laurent, Ivry-sur-Seine, France

[22] Filed: Jan. 30, 1975

[21] Appl. No.: 545,536

[30] Foreign Application Priority Data
Jan. 31, 1974  France .................. 74.03203

[52] U.S. Cl. ............... 228/45; 228/49; 269/1; 269/21
[51] Int. Cl.² .................................. B23K 37/02
[58] Field of Search .......... 269/1, 21, 315, 319; 29/200 J, 200 P; 113/1 M; 228/4, 45, 47, 49

[56] References Cited
UNITED STATES PATENTS

| | | | |
|---|---|---|---|
| 2,773,299 | 12/1956 | Mack | 269/315 |
| 2,779,360 | 1/1957 | Snow | 269/315 |
| 2,935,314 | 5/1960 | Ford | 269/1 |
| 3,324,535 | 6/1967 | Johnson | 29/200 J |
| 3,389,724 | 6/1968 | Paul | 269/1 |
| 3,592,095 | 7/1971 | Passa | 269/21 |
| 3,848,323 | 11/1974 | Perger | 113/1 M |
| 3,848,324 | 11/1974 | Perger | 113/1 M |

*Primary Examiner*—Al Lawrence Smith
*Assistant Examiner*—Robert C. Watson
*Attorney, Agent, or Firm*—O'Brien and Marks

[57] ABSTRACT

A support for the carriage of a welding head intended for the automatic welding of metal plates comprising plane areas framed by corrugations running in two perpendicular directions and intersecting to form abutment surfaces at the ends of the corrugations. This support comprises a base equipped with means for fixing the base to one of the said plane areas, means for centering the base with respect to the corrugations surrounding the plane areas by contact with a plurality of the said abutment surfaces, and adjustable stops for defining the distance from the base to the plane area by contact with a plurality of the said corrugations, the said base including means for mounting on the base a guide bar designed to receive the said carriage translationally.

16 Claims, 8 Drawing Figures

U.S. Patent   February 3, 1976   Sheet 5 of 5   3,935,985
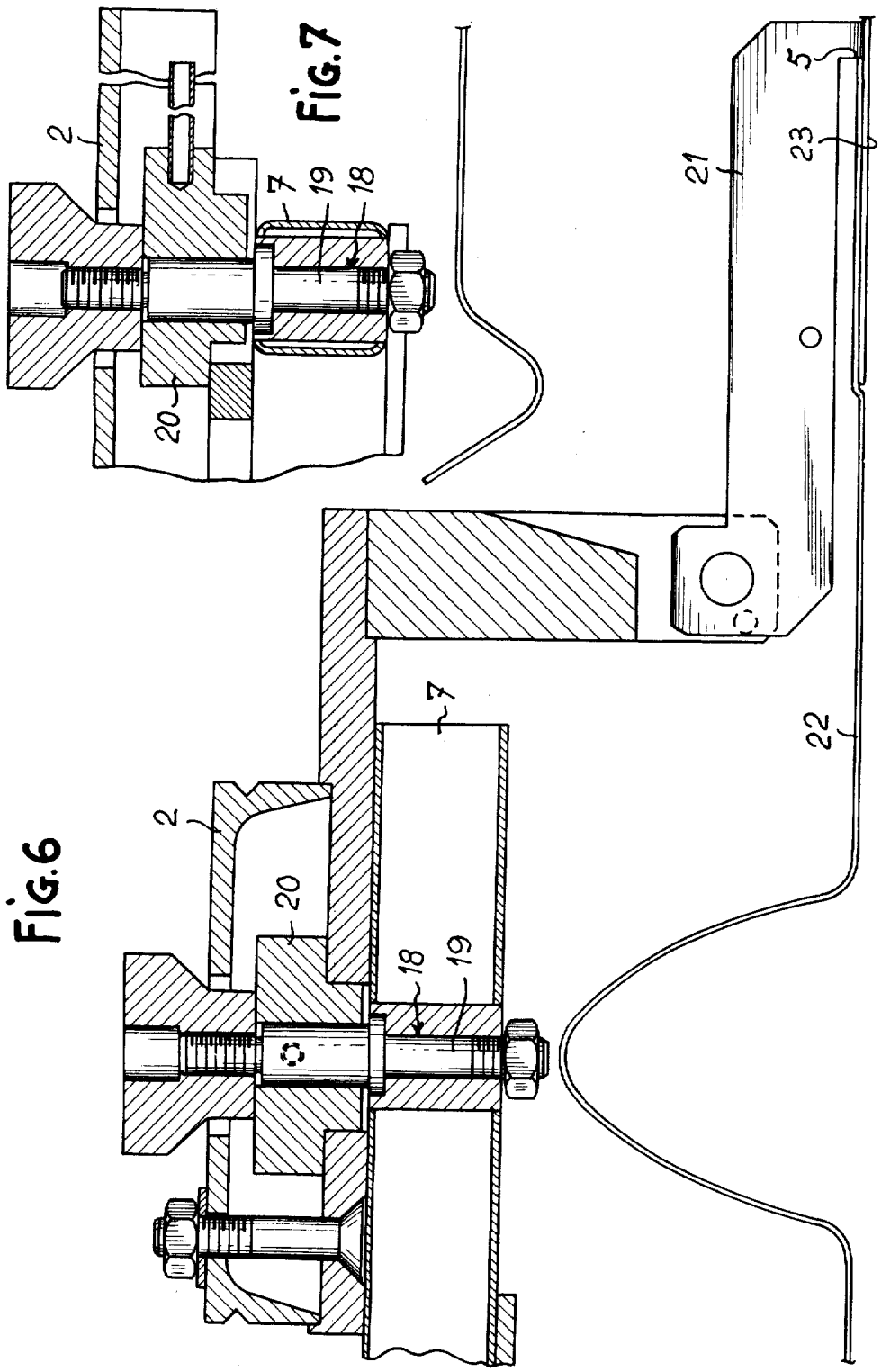

SUPPORT FOR WELDING HEAD CARRIAGE

BACKGROUND OF THE INVENTION

1. Field of the Invention

The present invention relates to the automatic welding of metal plates.

More precisely, such metal plates include plane areas framed by corrugations running in two perpendicular directions and intersecting to form abutment surfaces at the ends of the corrugations.

These plates, which are obtained by bending and shaping initially plane plates by means of suitable stamps so as to obtain first the corrugations in one direction and then the corrugations in the other direction, are commonly called "waffle plates." At the meeting point of the corrugations, distortions of the corrugations are naturally formed, with folds or bends which constitute abutment surfaces at the ends of the corrugations.

By abutment surface it is intended to signify that by following the corrugations bordering the plane areas one abuts against the said surfaces at each end of the corrugations.

The automatic welding of such plates appears very attractive, especially in the case of the assembly of a large number of plates, for example for the constructions of tanks or reservoirs, and in particular on ships for transporting liquefied gas and for the storage of liquefied gases on land.

2. Description of the Prior Art

Welding apparatus are known which comprise a support designed to support the carriage of a welding head, but the known supports are not usable for the welding of waffle plates.

SUMMARY OF THE INVENTION

According to the invention, the support comprises a base provided with means for removably fixing the base to one of the said plane areas, means for centering the base with respect to the corrugations surrounding the plane areas by contact with a plurality of said abutment surfaces, and depth stops for defining the distance from the base to the plane area by contact with a plurality of said corrugations, said base including mounting means for mounting on the base a guide bar designed to receive said carriage translationally.

In the preferred embodiment, the base comprises fixing means of suction-cup type for attaching itself to any one of the plane areas, centering stops adapted to come into contact with at least two of the four abutment surfaces located at the ends of two parallel corrugations defining the plane area, and depth stops adapted to come into contact with the tops of these two corrugations.

Preferably the depth stops are independent of the centering means.

The centering stops may be fixed with respect to the base; the depth stops are fixed or movable with respect to said base and are unadjustable or adjustable by translation in their direction of abutment or by substitution.

In the preferred embodiment, a means for mounting the guide bar on the base enables the guide bar to be fixed parallel to the corrugations.

A base of this kind can be manufactured in simple manner in the form of a metal sheet having lugs in the form of corner channels united angularly with the plate.

The underside of the metal sheet bears a seal closed on itself which co-operates with the plate to form a suction cup from which the air can be exhausted through a tube extending through the sheet to terminate in the space circumscribed by the seal, this tube being connected to a suitable suction device.

The lugs with which the sheet is provided bear on the one hand four stops of which at least two will be in simultaneous use by contact with two of the said abutment surfaces, and they bear on the other hand four stops designed to operate simultaneously, transversely of the first stops, by contact with the tops of two of the corrugations.

For mounting on the base the guide bar designed to receive the said carriage translationally, it is provided that there be used preferably a frame fixed to the base, for example a frame fixed to the said lugs and the sides of which are respectively parallel to the corrugations.

The guide bar which is mounted on the base to define the path of translation of the carriage bearing the welding head is a guide bar known per se which comprises two eccentrics pivoting on the base and serving to position the guide bar exactly parallel to the desired welding line, that is to say normally the edge of the plate to be welded is overlapping the plate bearing the base.

According to the invention, the guide bar is equipped with indicators coplanar with the pivots of the eccentrics, beyond the welding line to be produced, for defining and rendering visible the distance which should exist between the guide bar and the welding line.

The invention likewise recommends that the welding head be mounted so that it is translatable along its axis and that its axis be traanslatable in a direction parallel to the plane of the plates to be welded and perpendicular to the plane containing the theoretical welding line and perpendicular to the plane of the plates, in order to permit fine adjustment of the operating position of the heat.

These various translation means may be means known per se and it is recommended that the translational movements be controlled by means of micrometer screws for taking up of play.

BRIEF DESCRIPTION OF THE DRAWINGS

An embodiment of an apparatus according to the present invention will be described hereinafter with reference to the Figures of the accompanying drawing, in which:

FIG. 6 is a longitudinal section, in the plane VI—VI of FIG. 1, of one of the eccentrics of the guide bar with the indicator which is coplanar therewith;

FIG. 7 is a cross-section, in the plane VII—VII of FIG. 1, of the eccentric of FIG. 6.

DESCRIPTION OF THE PREFERRED EMBODIMENTS

Figure 1:
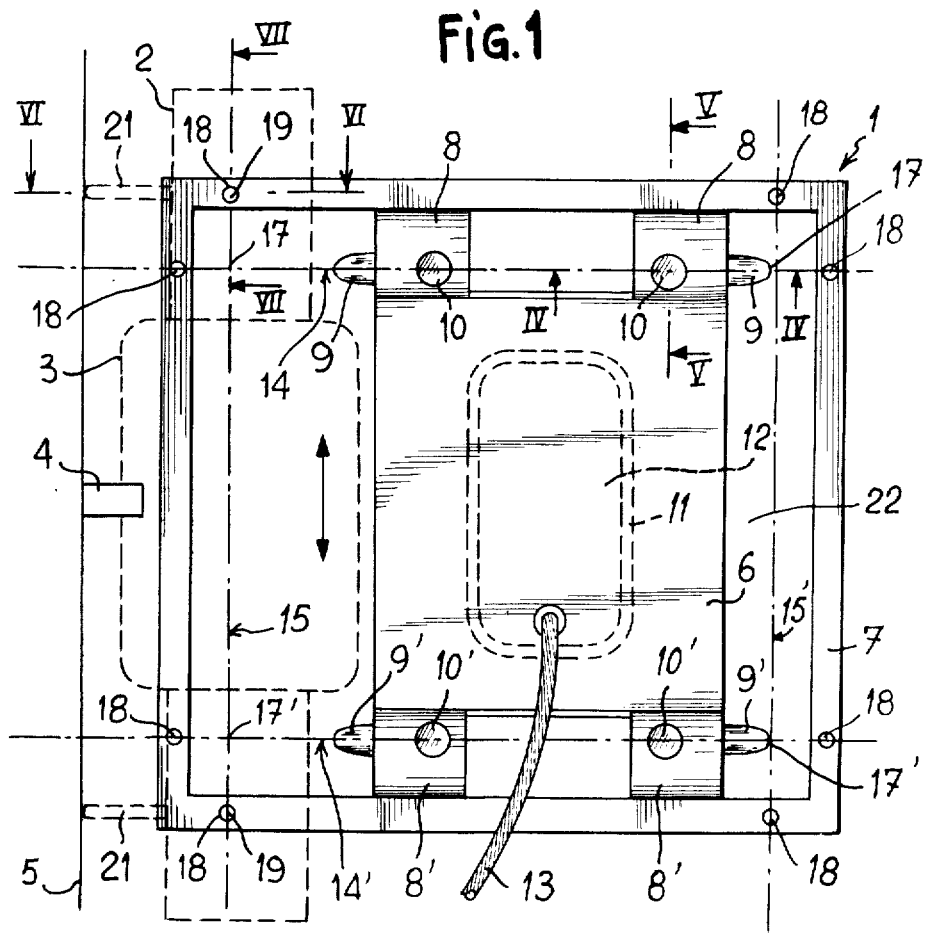
FIG. 1 is a diagrammatic view of an apparatus according to the present invention.

The apparatus comprises a fixed support 1 (in solid lines in FIG. 1) on which is mounted a fixed guide bar 2 (in broken lines in FIG. 1), this guide bar carrying slidably a carriage 3 (in broken lines in FIG. 1), this carriage bearing a welding head 4 for producing a weld line 5.

Figure 2:
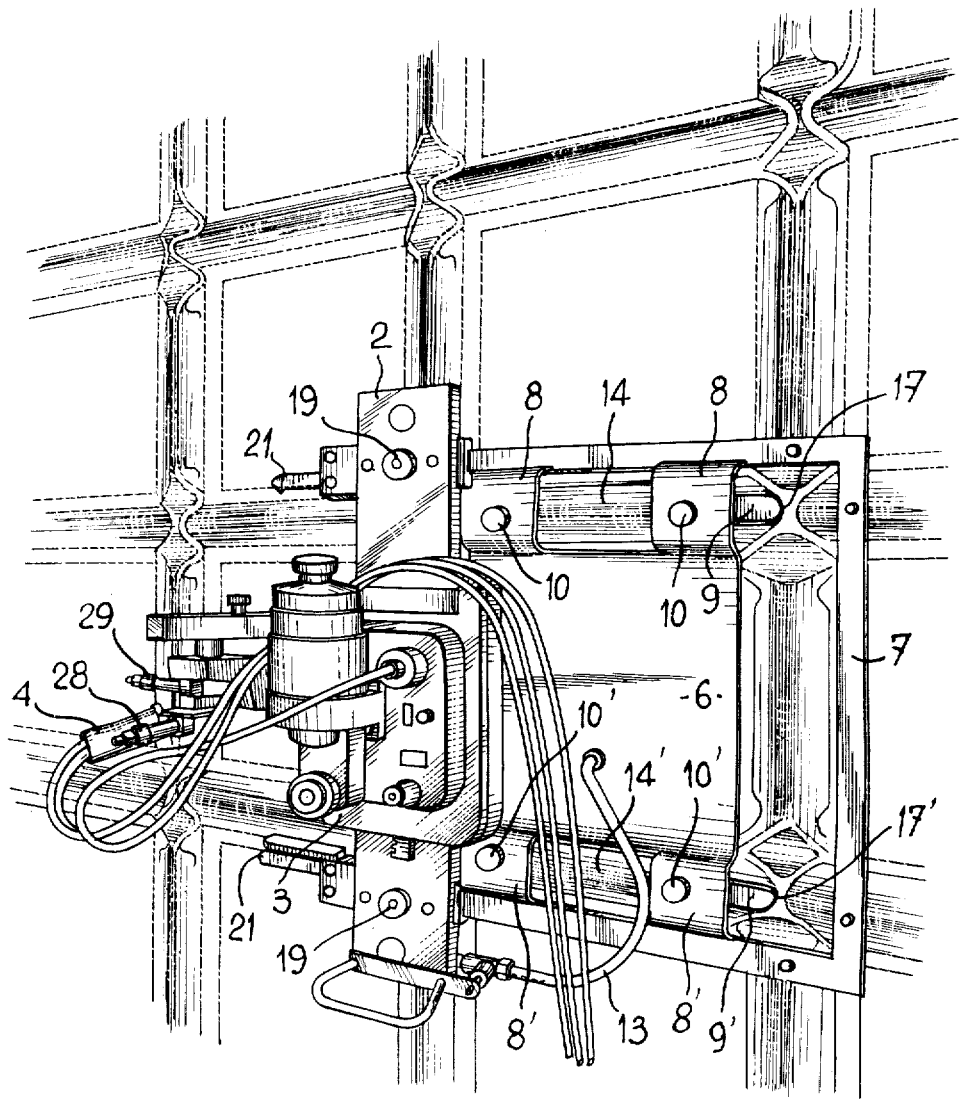
FIGS. 2 and 3 are two perspective views of an embodiment of the apparatus.

The support 1 is a one-piece body consisting of a metal sheet 6 integrated with a frame 7 through the medium of a plurality of lugs 8 and 8' obtained by cutting out and deforming the metal sheet (FIG. 2). The planes of the metal sheet and the frame are parallel.

Each of the lugs 8 and 8' carries a fixed lateral stop member 9 or 9' parallel to one of the sides of the frame and a threaded adjustable stop member 10 or 10' perpendicular to the plane of the frame.

The underside of the sheet 6 is equipped with a pressure seal 11 surrounding a space 12 from which the air can be exhausted through a hose 13 connected to the sheet 6 and opening into the space 12, so that a suction cup is formed.

The support is designed to be fixed by means of the suction cup to any one of the plane areas of the plates 22.

Lines 14, 14' and 15, 15' (FIG. 1) show diagrammatically the centers of the pairs of parallel corrugations which define the area of a plate 22 to which the sheet 6 is fixed.

Before exhausting the air to obtain the suction-cup effect, care is taken to arrange the support so that one of the lateral stops 9 and one of the lateral stops 9' are simultaneously in a position of abutment against certain of an abutment surfaces 17 and 17' which are located at the ends of currugations 14 and 14'.

In order to ensure adjustment of the height of the support with respect to the plane of the plate 22, the four adjustable stops 10 and 10' are then operated, these stops, in this example, being screw studs which bear on the tops of the corrugations 14 and 14'.

Figure 4:
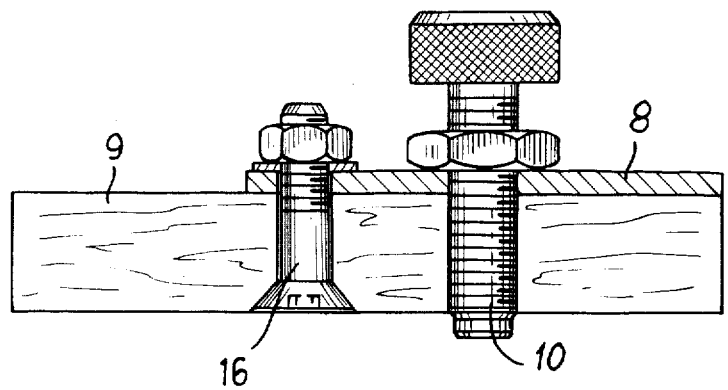
FIGS. 4 and 5 are sections, in the plane IV—IV and the plane V—V, respectively, of FIG. 1, of one of the centring means and one of the depth means of the support.
Figure 5:
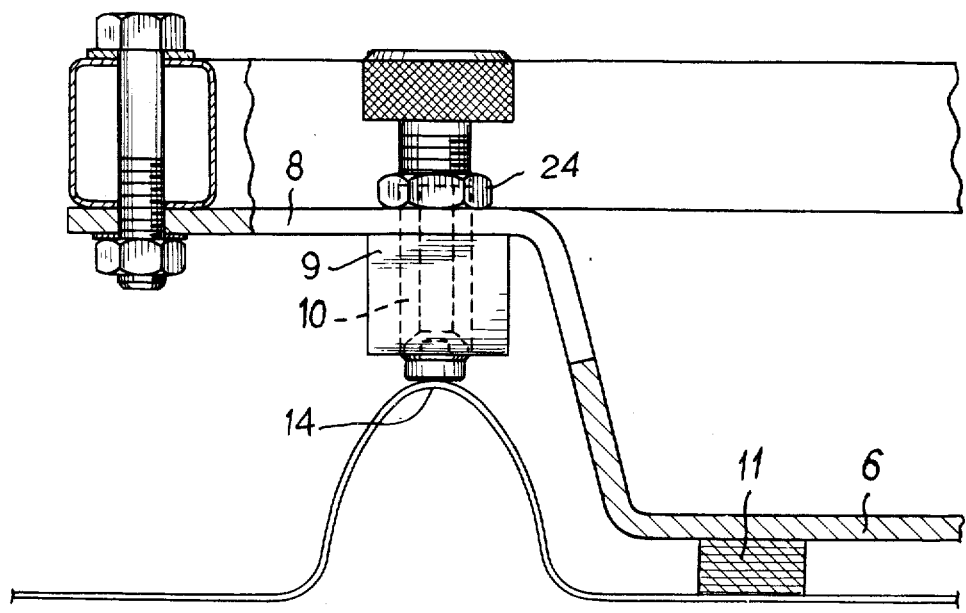

FIGS. 4 and 5 show the details of the mounting of a lateral stop 9 and an adjustable stop 10 on a lug of the support. The stop 9 is fixed by a bolt 16 and the adjustable stop 10, which extends through the stop 9, is a milled head screw bearing on the top of the corrugation 14. The axial position of the stop 10 is adjusted by screwing or unscrewing a nut 24 fixed to the lug 8.

The guide bar 2 is fixed to the frame 7 by any suitable means whatsoever which permits fixing parallel to two sides of the frame.

In the example shown, the frame 7 of the base has eight holes or seats 18, in four rows, parallel to the corrugations. The guide bar 2 is disposed above two of these holes, and connected to said holes by the two pivots 19 of two eccentrics 20. The eccentrics are provided so that two indicators 21 may be moved into position for the welding project and out of position for transporting purposes.

The two adjustable indicators serve to define and render visible the distance which should exist between the guide bar 2 and the welding line 5 by extending out to the welding line and becoming adjacent the two plates 22 and 23 as shown in FIG. 6.

The carriage 3 bearing the welding head 4 and conventional accessories is mounted on the guide bar for translational movement.

Figure 8:
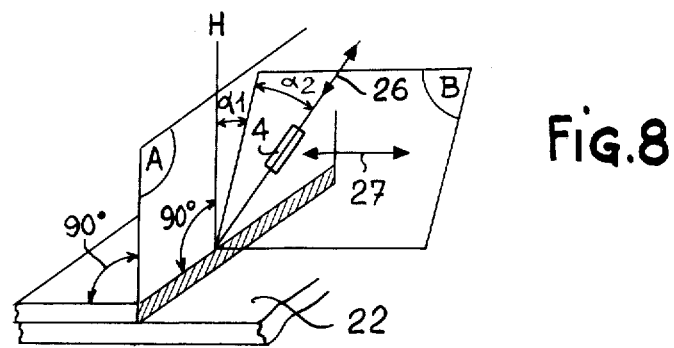
FIG. 8 is diagrammatic view illustrating the possibilities of adjusting the position of the welding head.

If we consider (FIG. 8) the plane A which contains theoretical welding line 5 and which is perpendicular to the two plates to be welded, the line H located in the plane a is perpendicular to the weld, and the plane B which contains the axis 25 of the welding head 4 is inclined, in manner known per se, by a chosen angle $\alpha_1$ with respect to the line H. Moreover the axis 25, in manner known per se, is inclined in the plane B by an angle $\alpha_2$ with respect to the intersection of the two planes A and B.

According to the present invention, the means for mounting the head on the carriage are such that the head is movable by translation along its axis 15 and this axis is itself movable by translation in the plane B, in a direction perpendicular to the plane A. These two directions of translation have been marked by arrows 26 and 27 in FIG. 8. This is a matter of translational movements for the fine adjustment of the operating position of the welding head.

There are many known means enabling these translational movements to be achieved and they do not need to be described in detail.

Figure 3:
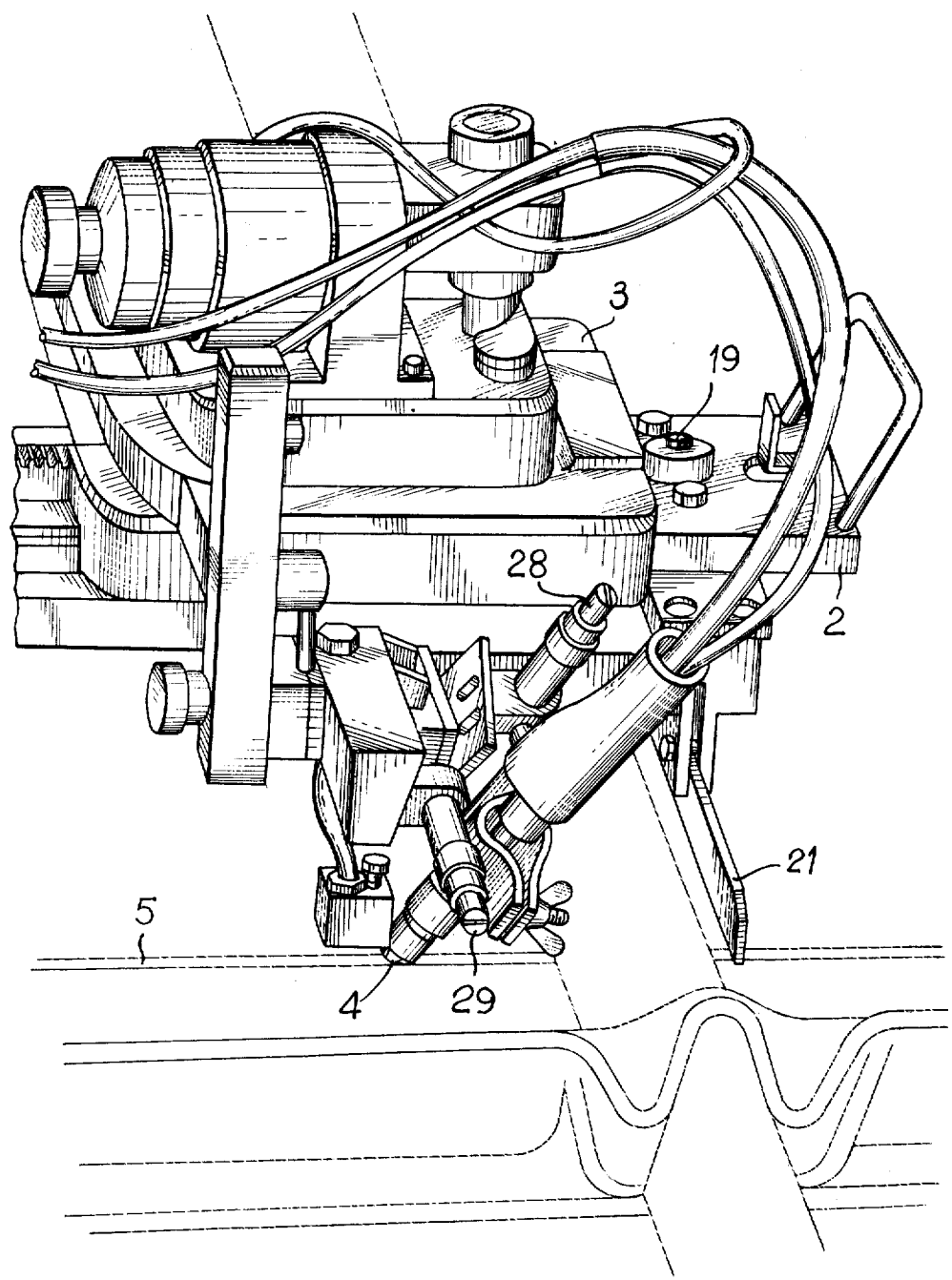

It may be pointed out, however, that to control these translational movements it is advisable to use micrometer screws, such as, for example, the screws 28 and 29 (FIGS. 2 and 3), which are arranged along the axes 26 and 27, respectively, for controlling the corresponding translations.

Various changes can be made in the embodiment which has been disclosed above. Thus the fixing means can comprise magnetic means, the adjustable stops can be substituted with interchangeable stops of various sizes or the stops can be unadjustable with respect to the supports.

We claim:

1. A support for the carriage of a welding head for the automatic welding of metal plates comprising
   corrugated elements disposed in two peripendicular directions so as to intersect each other,
   abutment surfaces at the ends of said corrugated elements at their intersections,
   planar members surrounded by said corrugated elements and disposed between the intersections thereof,
   a base adapted to be removably fixed to one of the planar members,
   means for centering the base with respect to the corrugations surrounding the planar members by contact with a plurality of said abutment surfaces,
   means defining the distance from the base to the planar member by contact with a plurality of said corrugations,
   means for mounting a guide bar on said base parallel to at least one of said corrugations whereby the guide bar may receive the carriage in a translational manner, and
   suction means for removably fixing the base to one of the planar members.

2. A support according to claim 1 wherein the means defining the distance between the base and the plate area are independent of the centering means.

3. A support according to claim 1 wherein the means defining the distance between the base and the plate area are contiguous with the tops of the two parallel corrugations.

4. A support according to claim 3 wherein the means defining the distance between the base and the plate area are movable with respect to said base.

5. A support according to claim 4 wherein the means defining the distance between the base and the plate area are adjustable by translation in the direction of the abutment.

6. A support according to claim 4 wherein the means defining the distance between the base and the plate area are replacable by unadjustable means of different sizes.

7. A support according to claim 3 wherein the means defining the distance between the base and the plate are fixed with respect to said base.

8. A support according to claim 1 wherein the base comprises suction cup means for attaching itself solely to any one of the plane areas, centering stops adapted to come into contact with two of the four abutment surfaces located at the ends of two parallel corrugations defining the plane area, and means to define the distance between the base and the plate adapted to come into contact with the tops of these two corrugations.

9. A support according to claim 1 wherein the base is a metal sheet having lugs in the form of corner channels united angularly with the sheet.

10. A support according to claim 9 wherein the underside of the sheet bears a pressure seal closed on itself which cooperates with the plate to form a suction cup from which air can be exhausted through a tube extending through the sheet to terminate in the space circumscribed by the seal, said tube being connected to suction device.

11. A support according to claim 9 wherein the lugs with which the plate is provided bear four fixed centering stops of which two will be in simultaneous use.

12. A support according to claim 9 wherein the lugs with which the plate is provided bear means to define the distance between the base and the plate, of which four will operate simultaneously.

13. A support according to claim 12 wherein the means for mounting the guide bar on the base are a frame fixed on said base.

14. A support according to claim 13 wherein said frame for mounting the guide bar is fixed to said lugs.

15. A support according to claim 1 wherein the guide bar comprises two eccentrics pivoting on the base and serving to position the guide bar parallel to the desired welding line and wherein the guide bar is provided with indicators coplanar with the pivots of the eccentrics, beyond the welding line to be produced, for defining the and rendering visible the distance which should exit between the guide bar and the welding line.

16. A support according to claim 1 wherein the welding head is translatable along its axis and wherein the axis of the head is translatable in a direction parallel to the plane of the plates and perpendicular to the plane containing the theoretical welding line and which is perpendicular to the said plane of the metal sheet.

* * * * *